United States Patent [19]

Stoll

[11] Patent Number: 4,541,257
[45] Date of Patent: Sep. 17, 1985

[54] SAFETY LOCK FOR AUTOMOBILES

[76] Inventor: Rudi Stoll, Karl-Schlageter Strasse 22 a, D-7512 Rheinstetten-FO., Fed. Rep. of Germany

[21] Appl. No.: 535,595

[22] Filed: Sep. 26, 1983

[51] Int. Cl.[4] .................... E05B 65/12; B60R 25/06
[52] U.S. Cl. ........................................ 70/247; 70/201; 70/254
[58] Field of Search ................. 70/247, 245, 248, 249, 70/250, 251, 201, 202, 254; 74/475, 473 R

[56] References Cited

U.S. PATENT DOCUMENTS

| | | | |
|---|---|---|---|
| 1,662,099 | 3/1928 | Anderson | 70/201 |
| 3,583,184 | 6/1971 | Papele | 70/247 |
| 4,231,241 | 11/1980 | Lipski | 70/245 |

FOREIGN PATENT DOCUMENTS 348605  5/1931  United Kingdom ................. 70/247

Primary Examiner—Robert L. Wolfe
Attorney, Agent, or Firm—Klaus J. Bach

[57] ABSTRACT

A safety lock for automobiles with a manual transmission operable by a shift stick is associated with the shift stick which includes a double-armed shift lever supported by a ball joint pivotally disposed in a floor-mounted neck member and a locking sleeve disposed on the shift stick axially movable between upper and lower end positions in which the sleeve may be locked and having a locking member at its bottom end adapted to firmly engage a flanged tubular member mounted on the neck member when locked in its lower position.

3 Claims, 5 Drawing Figures

SAFETY LOCK FOR AUTOMOBILES

BACKGROUND OF THE INVENTION

The present invention relates to a safety lock for automobiles which have a manual transmission operable by a double-armed stick shift lever supported by means of a ball joint disposed within a neck portion mounted on the floor of the automobile.

Such a transmission shift lever lock is disclosed, for example, in U.S. Pat. No. 2,046,279 wherein the ball joint for the shift lever is arranged within an upwardly projecting transmission housing section which also receives a locking block. Such a locking arrangement, together with all the mounting structure, is an integral part of the whole transmission. It is provided by the transmission factory and cannot be retrofitted. Without doubt, such transmission locks are very safe, but they are unusable for vehicles in which they have not been installed by the factory assembling the vehicle and, therefore, they have not found any noticeable utilization.

It is the object of the present invention to provide a safety lock for automobiles, in which, like in the arrangement according to U.S. Pat. No. 2,046,279, the transmission shift lever may safely be locked but which may be installed into an automobile, especially a passenger car, after its assembly and which may be installed in a relatively simple and economical manner.

SUMMARY OF THE INVENTION

A safety lock for an automobile with a manual transmission operable by a shift stick pivotally mounted by a ball joint which is supported in a neck member mounted on the floor of the automobile includes a locking sleeve surrounding the shift stick and being movable between an upper operating position and a lower end position in which a locking member disposed at the lower end of the sleeve is received in an upper tube section projecting from a flange having a lower tube section firmly mounted on the neck member. Means are provided at the top end of the shift stick for locking the sleeve member in the upper operating position or in its lower end position in which its engagement with the flanged tube section prevents operation of the transmission.

The device according to the present invention need not be installed by the transmission and vehicle manufacturers. No provisions or changes on the transmission housing are necessary, which provisions would have to be made by the transmission manufacturer; rather, the invention utilizes the tubular neck member which receives the shift lever ball joint and which is normally provided in this type transmission for the support of the shift lever. Only a flanged tube section is mounted over the neck member, which flanged tube section is then utilized as a locking block and which is adapted to closely receive the locking member provided at the bottom end of the axially movable sleeve for blocking movement of the shift lever. In the locking position of the sleeve, shifting of the transmission is not possible. Shifting is only possible when the axially movable sleeve is in its upper end position where it is preferably also lockable for safety reasons.

The arrangement according to the present invention may easily be installed into automobiles even after manufacture simply by placing the flanged tube section onto the neck member mounted on the vehicle floor and replacing the original shift lever by a new lever which carries an axially movable sleeve which has at its lower end a lock member and which may be locked to the transmission shift lever in its lower end position in which it blocks operation of the shift stick.

SHORT DESCRIPTION OF THE DRAWINGS

DESCRIPTION OF A PREFERRED EMBODIMENT

Figure 1:
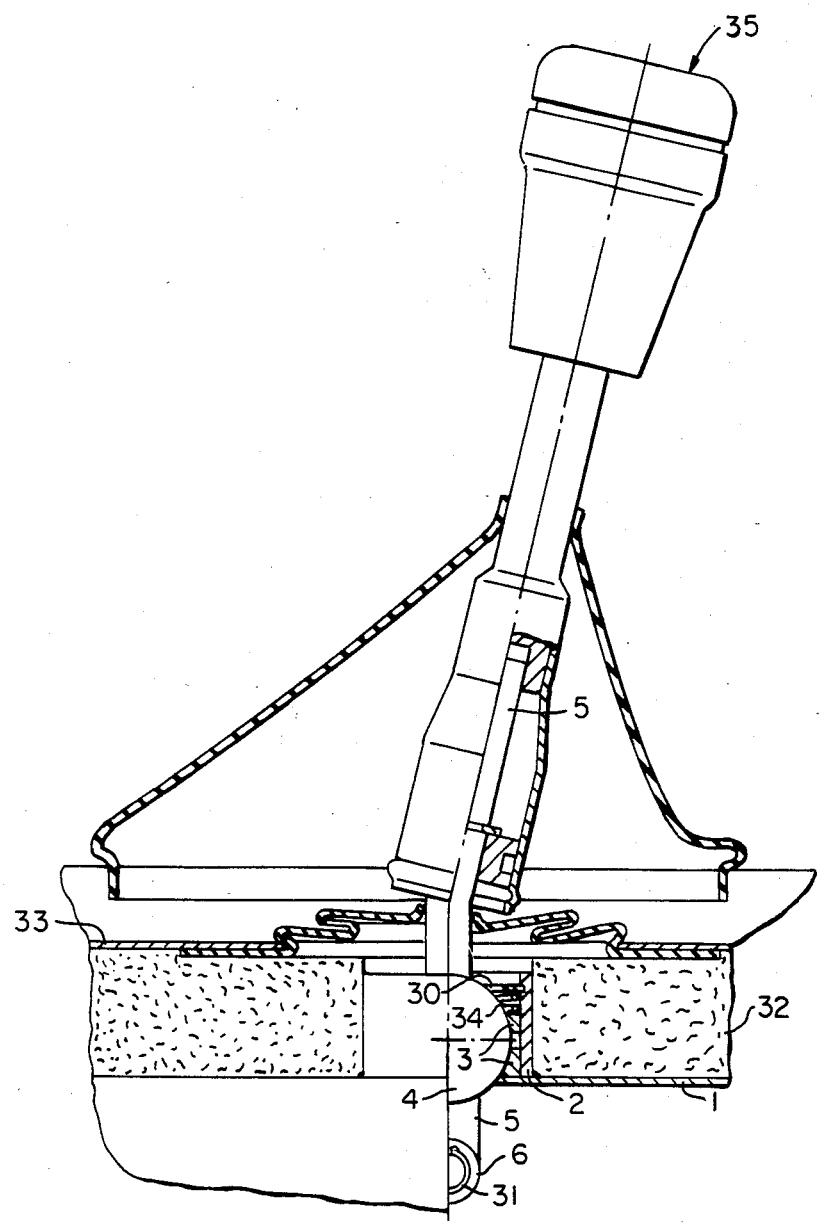
FIG. 1 shows a shift lever of common design which is pivotally supported by a ball joint.

As shown in the figures, the bottom floor panel 1 of an automobile has a neck member 2 mounted thereon and surrounded by a layer 32 of a foamed material above which a top floor panel 33 is disposed which forms the top surface of the automobile's floor. A double arm shift lever 5 is pivotally supported by means of a ball joint 4 mounted within the neck member 2 by bearing rings 3. The bearing rings 3 are forced into engagement with the ball joint 4 by a spring 34 which is held in position by a spring ring 30 seated in a groove in the neck member 2. The shift lever 5 has its lower end below the automobile's floor linked to a transmission by a shift rod 6 which is secured to the shift lever 5 by a lock washer 31. The upwardly projecting arm of the shift lever 5 carries at its upper end a shift stick 35.

For the installation of the safety device according to the invention, the shift stick 35 alone is removed from the upper end of the shift lever 5 and replaced by a new shift stick 35a (FIG. 4) or the shift stick 35 is removed together with the double arm shift lever 5 and the ball joint 4 and replaced by a new structure.

Experience has shown that, generally, the second method is preferable, since the ball joint 4 and the bearing rings 3 are usually worn to such a degree that their replacement is justified.

Figure 2:
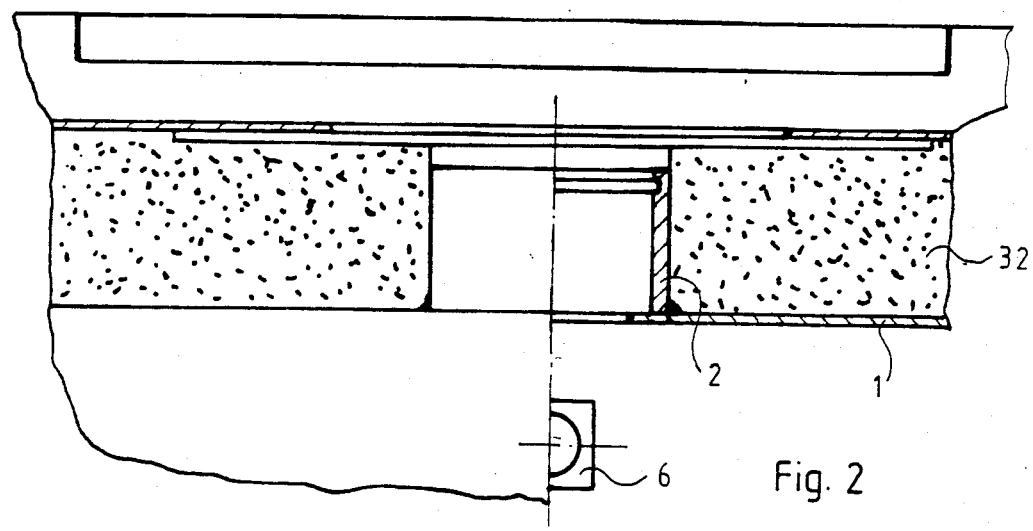
FIG. 2 shows a section of a vehicle floor with the shift lever and ball joint removed.
Figure 3:
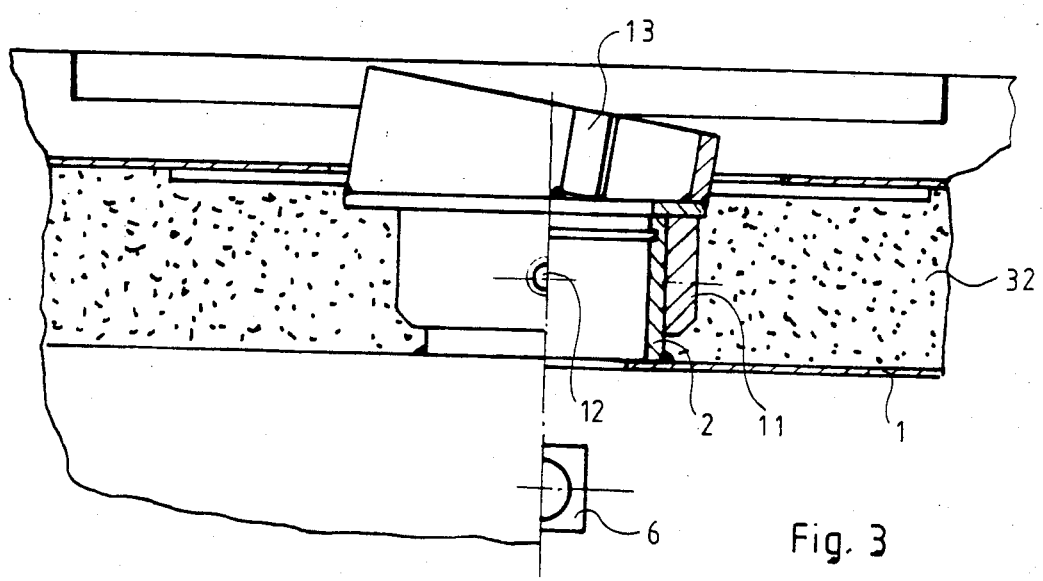
FIG. 3 shows the structure of FIG. 2 with a flanged tube member inserted.

After removal of the spring ring 30 and the lock washer 31, the complete original shift stick 35, together with the double arm shift lever 5, the ball joint 4 and the bearing rings 3 may be removed so that, of the whole structure, only the neck member 2 remains in place as shown in FIG. 2.

For the mounting of the safety device according to the invention, a flanged tube section 11, 12 is placed onto the neck member 2 and fixed in position by shear bolts. It is not difficult to move the flanged tube section 11 in position over the neck member 2 since the foamed material 32 does not provide any particular resistance. The flanged tube section 11, 12 consists of lower and upper tubular parts 11, 12 which are joined together by an intermediate flange 8. The upper tubular part 12 is inclined somewhat with respect to the lower tubular part 11 since the shaft stick of a passenger car is usually inclined backwardly. The upper tubular part 12, which is actually a locking member, includes a key 13 adapted to insure that the locking member 10 of a locking sleeve 9, which has a corresponding groove, is always inserted in the proper angular position.

After these preparations, the new shift stick 35 is inserted, its lower arm 5 is linked to the shift rod 6 and secured in place by the lock washer 31, the ball joint 4 together with new bearing rings 3 is placed into the neck member 2 and secured in place by the spring ring 30. Then already the safety device according to the invention is fully operative since the new shift stick 35 is already provided with the axially movable sleeve 9 which carries the locking member 10 at its lower end and has a lock 15 provided in the shift button for locking the sleeve 9 in both axial end positions by means of a lock pin 16 operable by a key 17 which is insertable into the lock 15, the locking pin 16 being radially movable into, and out of, engagement with the sleeve 9.

Figure 4:
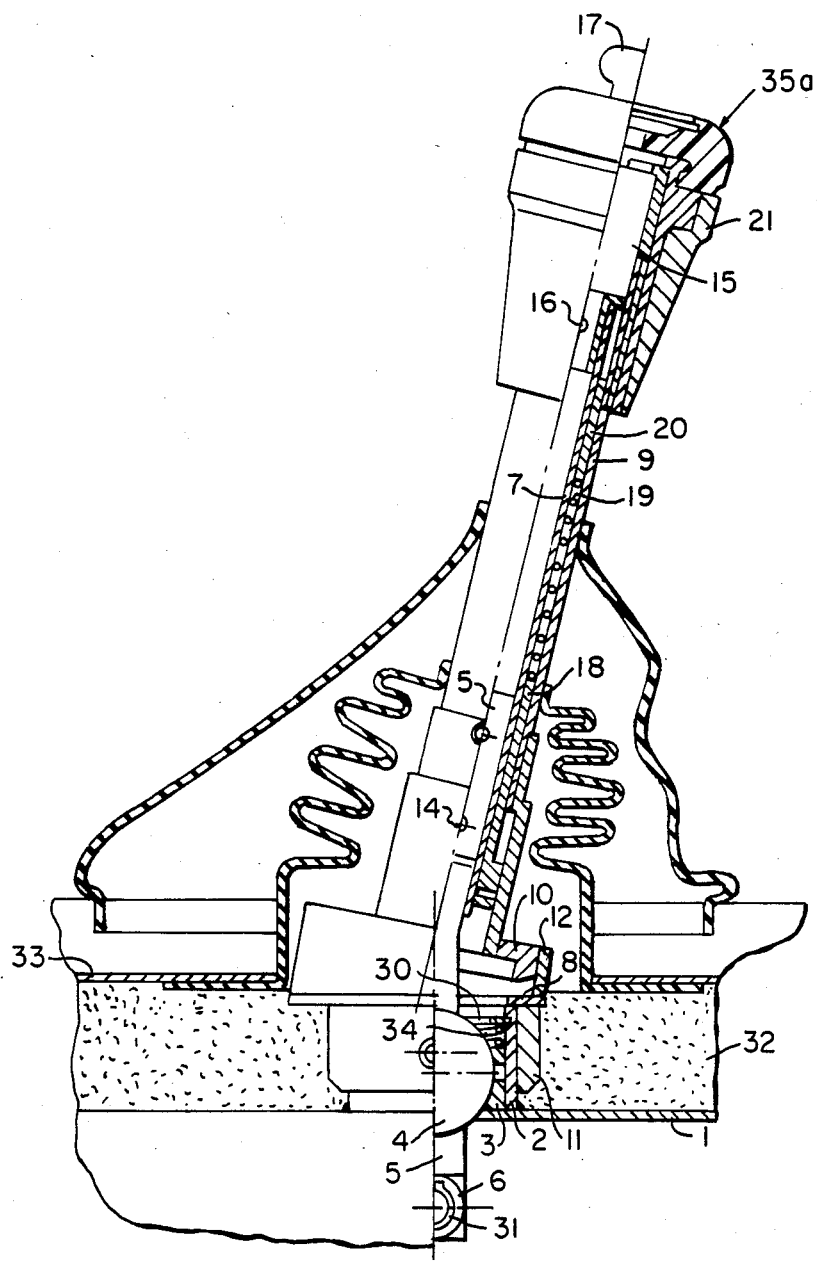
FIG. 4 shows a new shift stick mounted and the locking sleeve in depressed locking position.
Figure 5:
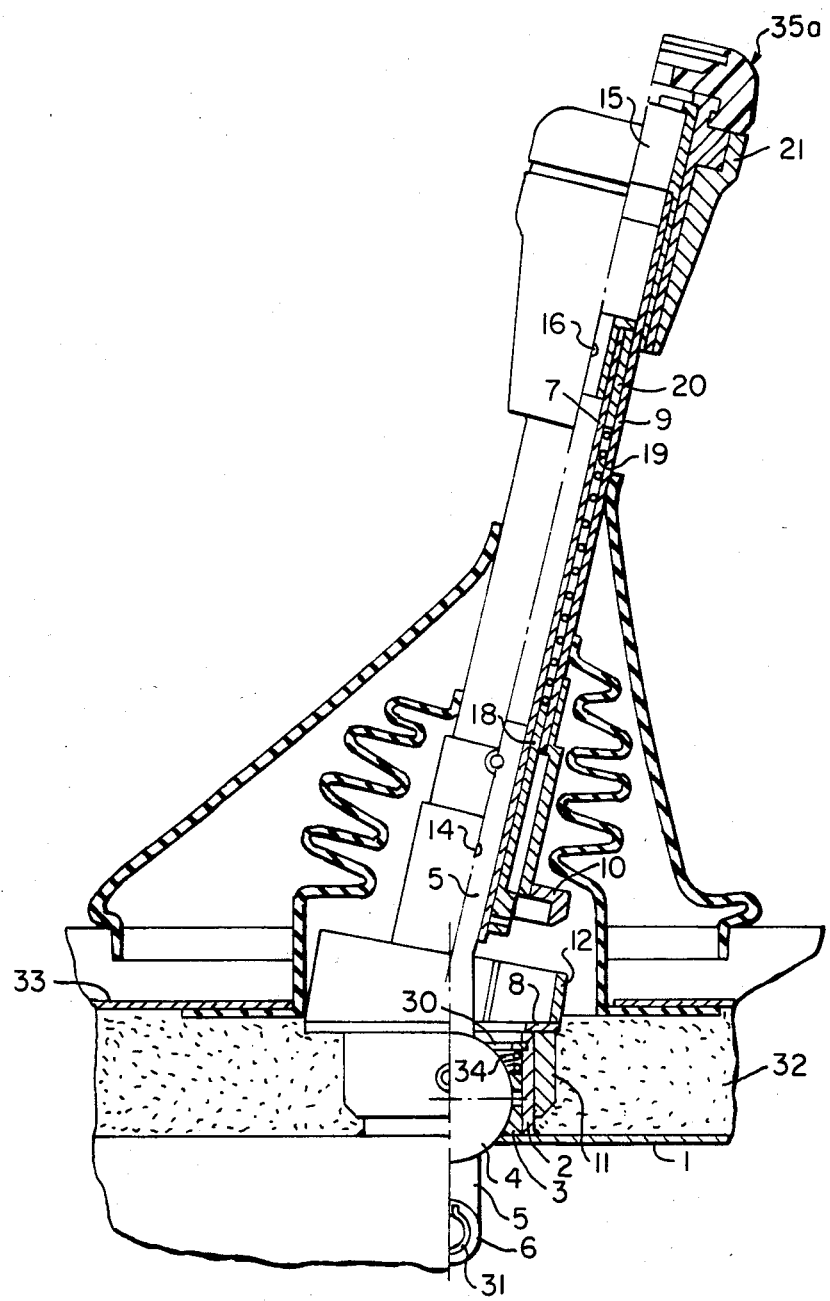
FIG. 5 shows the arrangement of FIG. 4 with the locking sleeve in its raised non-blocking position.

FIG. 4 shows the shift lever in a locked state and so does FIG. 5, left side, while the right side shows the shift lever in the operative position. As shown in FIG. 4, the locking member 10 is inserted into the flanged tube section 12 in which position operation of the shift lever is blocked. As shown in the right side of FIG. 5, the locking member 10 is disposed in a non-restraining position above the flanged tube section 12 in which position the shift stick 35 is freely movable.

The shift stick 35a comprises a tube 7 mounted on the upper arm of the shift lever 5 by means of pins or bolts 14, the axially movable sleeve 9 being disposed around and spaced from the tube 7. A tubular guide member 18, preferably of plastic material, is fastened to the lower end portion of the tube 7 for slidably supporting the lock member 10. A spring 19 is disposed in the annular space between the tube 7 and the sleeve 9 and abuts at its lower end said guide member 18 and, at its upper end, a ring member 20 associated with the locking sleeve 9 so as to resiliently retain the sleeve 9 with the locking member 10 out of engagement with the tube section 12. The shift button 21 is mounted on the sleeve 9 and is axially movable therewith. A lock 15 is disposed within the shift button 21 and is adapted to operate the locking pin for engagement with the shift lever-mounted tube 7 to hold the locking sleeve 9 down against the force of spring 19 for locking the transmission as to lock the sleeve 9 in its upper operative position.

A trained worker needs only a few minutes for the conversion of the gear shift mechanism. Accordingly, the installation of the device according to the invention involves only minimal expenditure. It is noted, furthermore, that the parts required are inexpensive so that the complete installation is very economical.

The safety device according to the present invention therefore permits retrofitting thereof into vehicles in a very economical manner.

I claim:

1. A safety lock for an automobile with a manual transmission operable by a floor-mounted shift stick, said shift stick including a double-armed shift lever having an operating ball pivotally supported in a neck member mounted on the floor of the automobile, said safety lock comprising a flanged double tube member having lower and upper tube sections interconnected by an intermediate flange, said lower tube section closely fitting over said neck member for engagement therewith and said upper tube section projecting upwardly from said intermediate flange, a locking sleeve disposed on said shift stick and being axially movable thereon between upper and lower end positions, said sleeve having a locking member disposed at its lower end and adapted and sized to fit into said upper tube section so as to be tightly received therein when said locking sleeve is in its lower end position thereby to prevent operation of said shift stick, and a lock disposed at the upper free end of said shift stick and capable of locking said sleeve in at least one of its upper and lower end positions, said shift stick including an inner tube adapted to be firmly connected to said shift lever, with said locking sleeve being slidably disposed on said inner tube with an annular gap therebetween and a coil spring disposed in said annular gap abutting at one end tubular means connected to said inner tube and at the other end a ring member movable with said locking sleeve for resiliently forcing said locking sleeve toward its upper end position.

2. A safety lock as claimed in claim 1, wherein said upper tube section is mounted on one side of said flange so as to extend at an angle with regard to the lower tube section mounted on the other side of said flange.

3. A safety lock as claimed in claim 1 wherein said tubular means connected to said inner tube is a tubular guide member fastened to the lower end portion of said inner tube and slidably engaging said lock member for firmly retaining said shift lever when said lock member is in its locking position within the upper flanged tube section.

* * * * *